United States Patent [19]

Nowak et al.

[11] Patent Number: 4,830,754

[45] Date of Patent: May 16, 1989

[54] METHOD OF RECOVERING AMINE IN A PROCESS FOR BREAKING EMULSIONS AND SLUDGES

[75] Inventors: James C. Nowak, Kent; Mark K. Tose, Maple Valley, both of Wash.

[73] Assignee: Resources Conservation Company, Bellevue, Wash.

[21] Appl. No.: 81,940

[22] Filed: Aug. 3, 1987

[51] Int. Cl.[4] .............................................. B01D 17/05
[52] U.S. Cl. ..................................... 210/639; 210/708; 210/709; 210/737; 252/344; 252/358
[58] Field of Search ............... 210/634, 639, 708, 709, 210/743, 768, 737; 252/344, 358, 329

[56] References Cited

U.S. PATENT DOCUMENTS

| | | | |
|---|---|---|---|
| 3,899,419 | 8/1979 | Emanuel | 210/642 |
| 3,925,201 | 12/1975 | Ames | 210/752 |
| 4,002,562 | 1/1977 | Ames et al. | 210/635 |
| 4,056,466 | 11/1977 | Peters | 210/634 |

*Primary Examiner*—Peter Hruskoci
*Attorney, Agent, or Firm*—Seed and Berry

[57] ABSTRACT

A method for using alkali for recovering amine used in a process for breaking emulsions and sludges. The amine has an inverse critical solution temperature with water. The process breaks a sludge into a water component containing residual amine and oil component if oil is present in the original sludge, and a solid matter component. The present invention uses alkali to minimize the amount of amine lost in the water component and in the solid matter component.

24 Claims, 3 Drawing Sheets

METHOD OF RECOVERING AMINE IN A PROCESS FOR BREAKING EMULSIONS AND SLUDGES

TECHNICAL FIELD

This invention relates in general to processes for breaking emulsions and sludges using an amine having an inverse critical solution temperature with water. In particular, this invention relates to a method for using alkali to recover the amine used, and a method of controlling the amount of alkali necessary to effect such recovery.

BACKGROUND OF THE INVENTION

A process for dewatering sludges containing solid matter and water using an amine or amine mixture having an inverse critical solution temperature is described in Emanual, U.S. Pat. No. 3,899,419. An improvement on that process is described in Ames, U.S. Pat. No. 3,925,201, issued Dec. 9, 1975 and assigned to the assignee hereof. A process for breaking sludges containing oil, water and sludges using amines having an inverse critical solution temperature with water is described in Ames & Peters, U.S. Pat. No. 4,002,562.

In Emanual, U.S. Pat. No. 3,899,419 a sludge is mixed with an amine or mixture of amines having an inverse critical solution temperature with water. At a temperature below the inverse critical solution temperature of the amine, the water in the sludge and any oily materials in the sludge will dissolve in the amine. The solid materials in the sludge can then be removed to leave a more or less single-phase mixture. Increasing the temperature of the single-phase mixture above the inverse critical solution temperature of the amine results in the formation of a two phase system: a water component containing residual amine, and an amine component containing residual water. Any oily matter which was in the sludge will remain with the amine component and can be treated with various processes. The water component may be further processed or recycled.

A problem not solved by the Emanual process is loss of the amine in the water component caused by the difficulty of removing the residual amine from the water component. There may also be further loss of the amine in the solid matter separated from the mixture. The loss of amine is problematic, particularly total recycling of amine is desired and where purity of end products is important.

Ames, U.S. Pat. No. 3,925,201 discloses a method for minimizing the residual amine in the solid matter and in the water component which method includes adding an alkaline composition to the sludge before addition of the amine. The alkaline composition is mixed into the feed stock prior to addition of the amine. However, practicing the Ames '201 invention has proven that addition of the alkaline composition to the sludge before addition of amine leads to greatly increased viscosity of the sludge making mixing and pumping of the sludge very difficult.

Expensive, heavy-duty mixing and pumping equipment may be required to achieve mixing and transport of the sludge-alkali mixture. Furthermore, the process taught by Ames U.S. Pat. No. 3,925,201 does not provide a convenient, accurate method for controlling the amount of alkali added to ensure that the amount added is adequate to reduce loss of amine.

Thus, there exists a need in the art for a method of minimizing the residual amine in the solid matter separated from the sludge and in the water component produced by the Emanual U.S. Pat. No. 3,899,419 process and of controlling the amount of alkali added to ensure that the amount added is adequate and to avoid the problems of increased viscosity of the sludge produced by the Ames U.S. Pat. No. 3,925,201 method.

DISCLOSURE OF THE INVENTION

It is an object of the present invention to provide a method for minimizing the residual amine in the solid matter separated from the sludge and in the water component produced by the aforementioned process without increasing the viscosity of the sludge and without creating pumping and mixing difficulty.

It is a further object of the present invention to control the amount of alkali added in the aforementioned process to optimize recovery of the amine from the water component and from the solid material.

The present invention is an improvement of the process of breaking an emulsion or sludge using an amine or a mixture of amines having an inverse critical solution temperature with water. The emulsion may contain water and oil, while the sludge may contain water and solid matter, or water, oil, and solid matter.

Where it is desired to break an emulsion containing oil and water, the emulsion is mixed with an amine or mixture of amines having an inverse critical solution temperature with water to form a single-phase water-oil-amine mixture, where the single-phase mixture has a temperature below the inverse critical solution temperature of the amine. When the temperature of the single-phase mixture is increased above the inverse critical solution temperature of the amine, a two-phase system results: a water component containing residual amine, and an oil-amine component containing residual water. The water component is then separated from the oil-amine component by physical separation processes, such as decanting. The water component contains residual amine, a large portion of which may be removed by known methods such as stripping. The oil-amine component, containing residual water, is processed by other methods not pertinent to the present invention.

Where it is desired to break a sludge containing water and solid matter, the sludge is mixed with an amine or mixture of amines having an inverse critical solution temperature with water to form a mixture, where the mixture has a temperature below the inverse critical solution temperature of the amine. At a temperature below the inverse critical solution temperature the water is completely miscible in the amine. The solid matter can be separated by known separation methods. The temperature of the remaining water-amine mixture is then raised above the inverse critical solution temperature of the amine to form a water component containing residual amine, and an amine component containing residual water. A large portion of the amine may then be removed from the water component by known methods, such as stripping. The sludge may contain oil which is soluble in the amine and remains in the amine component.

The present invention is an improvement to these prior art processes and includes the addition of alkali to the system under controlled conditions. In one embodiment, the alkali is added to the emulsion or sludge during the step of mixing the emulsion or sludge with the amine. Alternatively, or in conjunction with the first embodiment, the alkali may be added to the water component containing residual amine before the step of removing residual amine. The amount of alkali added to the system may be controlled by proper monitoring of the system to determine whether the amount of alkali is sufficient to remove substantially all residual amine from the water component in both emulsion and sludge systems, and whether the amount of alkali is sufficient to remove substantially all residual amine from the solid matter.

The alkali is selected from lithium hydroxide, sodium hydroxide, potassium hydroxide, calcium hydroxide magnesium hydroxide and a lithium, sodium, potassium, calcium or magnesium salt of a weak acid.

A second embodiment of the present invention is the addition of alkali to the water component, containing residual amine, before the step of removing the residual amine from the water component. The alkali is selected from the same group described above. In the second embodiment, the amount of amine added is sufficient to remove substantially all residual amine in the water component in both emulsion and sludge systems, and is sufficient to remove substantially all residual amine in the solid matter in sludge systems.

In a third embodiment, alkali is added at two points: alkali is added to the emulsion or sludge during the step of mixing the emulsion or sludge with the amine, as described in the first embodiment above; and trim alkali is added to the water component containing residual amine before the step of removing residual amine, as described in the second embodiment above. The total amount of alkali added in the third embodiment is sufficient to remove substantially all residual amine from the water component in both emulsion and sludge systems, and is sufficient to remove substantially all residual amine from the solid matter in sludge systems.

Each of the embodiments above may further include the step of determining whether the amount of alkali added is sufficient to remove substantially all residual amine from the water component, in both emulsion and sludge systems, and whether it is sufficient to remove substantially all residual amine in the solid matter in sludge systems. One method of making such a determination is measuring the pH of the water component after the step of removing residual amine from the water component. In many systems, where the amount of alkali added is sufficient to allow recovery of substantially all the amine, the pH of the water component with substantially all residual amine removed will be approximately 9.5 to 10.

The amine or mixture of amines used in the processes of the present invention may be selected from a group of amines having the formula:

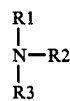

where R1 is hydrogen or alkyl; R2 and R3 are alkyl radicals having from one to six carbon atoms or alkenyl radicals having from two to six carbon atoms; and the total number of carbon atoms in the molecule is in the range of from three to seven, inclusive. An example of one such amine is triethylamine.

BEST MODE FOR CARRYING OUT THE INVENTION

The present invention is a method of using alkali in a process for breaking emulsions and sludges. The process for breaking emulsions and sludges uses an amine or mixture of amines having an inverse critical solution temperature with water. The amine of the present invention may be selected from a group of amines having the formula:

where R1 is hydrogen or alkyl; R2 and R3 are alkyl radicals having from one to six carbon atoms or alkenyl radicals having from two to six carbon atoms; and the total number of carbon atoms in the molecule is in the range of from three to seven. An example of such an amine is triethylamine.

The amines used in the present invention exhibit an inverse critical solution temperature with water. At a temperature below the inverse critical solution temperature, water is completely miscible with the amine. However, at a temperature above the inverse critical solution temperature, water is not miscible with the amine.

The alkali used in the present invention may be selected from the group consisting of lithium hydroxide, sodium hydroxide, potassium hydroxide, calcium hydroxide, magnesium hydroxide and a lithium, sodium, potassium, calcium, or magnesium salt of a weak acid.

The first preferred embodiment of the present invention will be described with reference to FIG. 1. A sludge containing oil, water, and solid matter is cooled to a temperature below the inverse critical solution temperature of the amine to be used in the separation process. In a mixing tank, the sludge is mixed with the amine, and at the same time, an alkali is added to the sludge and amine mixture. The entire mixture is maintained at a temperature below the inverse critical solution temperature of the amine to allow all water and oil to dissolve in the amine. At this point, the mixing tank contains solid matter, plus a single-phase mixture of water, oil, and amine.

The solid matter is then separated from the single-phase mixture by standard separation techniques, such as centrifugation or filtration. The solids may be washed with additional amine. The solids contain a small amount of amine which is removed in a dryer and recondensed to be recycled into the system. The solids can then be disposed of or used in other processes.

After the solid matter is removed, the temperature of the single-phase water-oil-amine mixture is increased above the inverse critical solution temperature of the amine to produce a two-phase system: a water component containing residual amine, and an oil-amine component containing residual water. These two components are separated from each other by physical separation, such as decanting. The oil-amine component may be further processed to allow for recovery of the amine as shown in FIG. 1.

Figure 1:
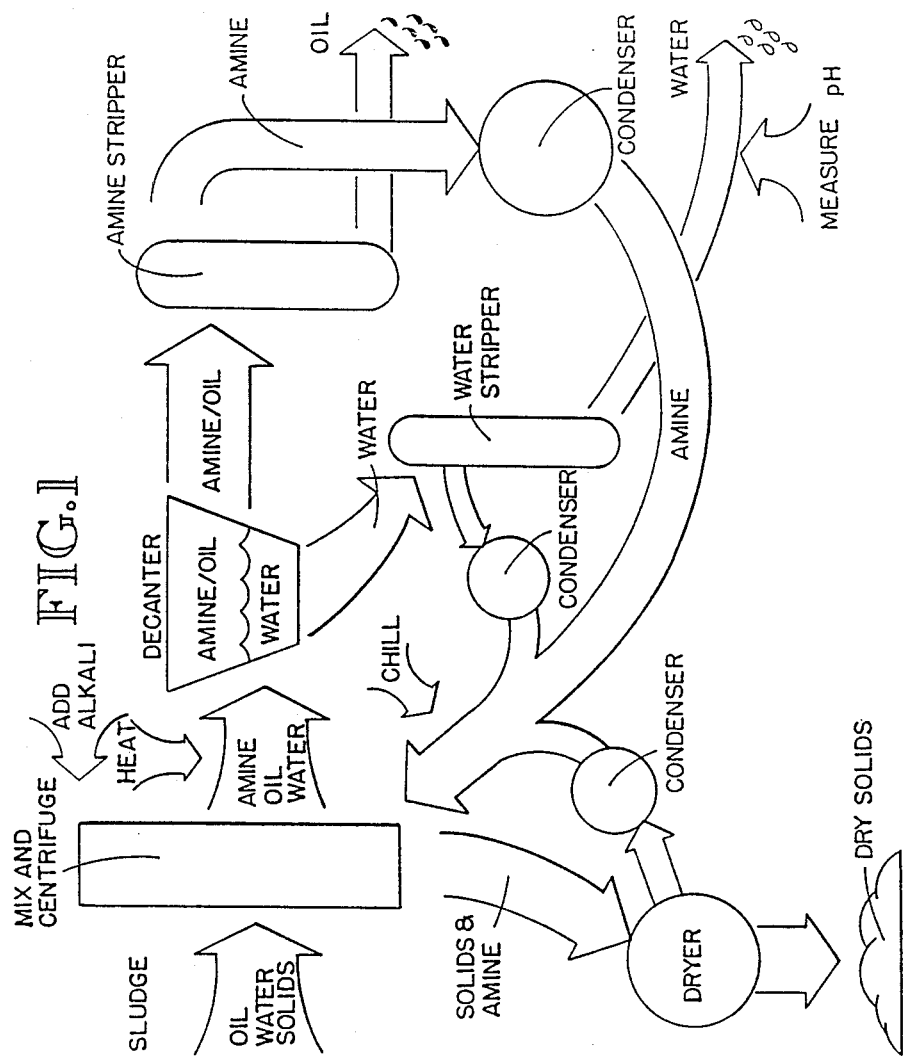
FIG. 1 is a schematic depiction of the first embodiment of the present invention as applied to a sludge system containing oil, water, and solids.

The water component then goes to a steam stripper where the residual amine is removed and recycled into the system as shown in FIG. 1. The substantially purified water can then be used in other known processes or can be disposed of. If the proper amount of alkali is added to the sludge along with the amine, the amount of amine remaining in the water component at the end will be minimal. Similarly, if the proper amount of alkali is added to the sludge, the amount of amine remaining in the solid matter after it is dried will be minimal.

The present invention may include the step of determining whether the amount of alkali added is proper. It is desirable to add a sufficient amount of alkali for the reasons discussed above, but it is also desirable not to add too much alkali. The water component is typically acidified as part of its further processing so it is desirable not to add more alkali to the system then is needed for recovery of the amine. In addition, if the pH of the water component is too high, the system may suffer from undesirable corrosion and problems associated with it.

One method for determining whether the amount of alkali added is sufficient is to measure the pH of the water component after removal of the residual amine. A preferred pH of the water component is 9.5 to 10. It is desirable to measure the pH after the amine has been removed, otherwise, the amine interferes with the pH detection process. For example, pH of the sludge-amine-alkali mixture cannot be easily monitored because pH-measuring probes are susceptible to fouling by the sludge and the amine interferes with the pH signal.

Another method for determining whether the amount of alkali added is sufficient is to determine the amount of amine remaining in the final water component after the step of removing substantially all residual amine. This could be done, for example, by gas chromatography of the final water component.

Figure 2:
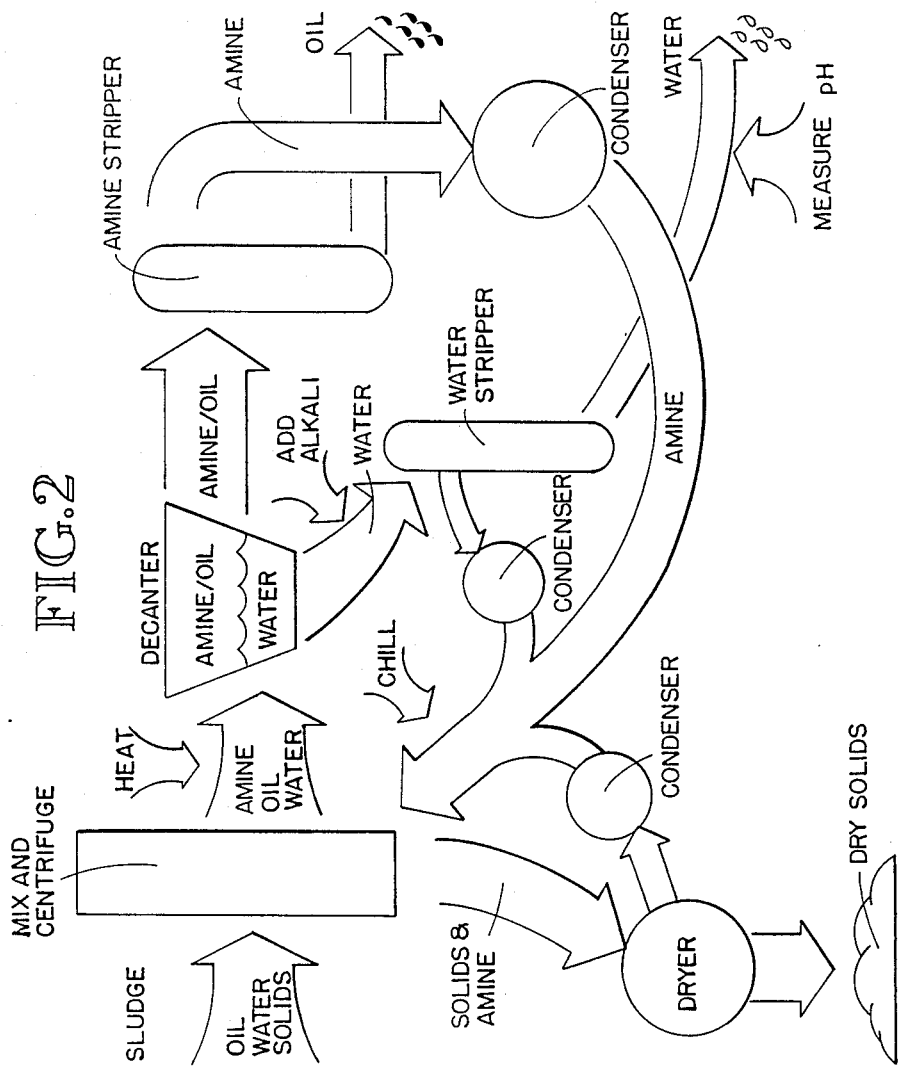
FIG. 2 is a schematic depiction of the second embodiment of the present invention as applied to a sludge system containing oil, water, and solids.

The second preferred embodiment will be described with reference to FIG. 2. The method shown in FIG. 2 is similar to that in FIG. 1 with the following exception - alkali is not added to the sludge along with the amine; instead, alkali is added to the water component before residual amine is removed. With addition of the proper amount of alkali, substantially all residual amine will be removed. As discussed above, the amount of alkali needed in the system to ensure recovery of substantially all amine can be monitored by measuring the pH of the water component after removal of residual amine. A preferred pH is 9.5 to 10.

In the third preferred embodiment, alkali is added at two points: alkali is added to the sludge along with the amine as in the first embodiment; and alkali is added to the water component before removal of residual amine, as in the second embodiment. The total amount of amine added is sufficient to remove substantially all residual amine from the water component, and is sufficient to remove substantially all residual amine from the solid matter. Preferably, the alkali added to the sludge along with the amine is approximately 85 to 95% of the total alkali added to the system. In this way, the alkali added to the water component is a trim alkali which allows the system to be more finely tuned to provide sufficient alkali without overloading the system and raising the pH to an unacceptably high level.

The present invention is not limited to sludges containing oil, water, and solids; it may be used effectively on sludges containing water and solids. Neither is the invention limited to sludges; it may be used effectively on emulsions containing oil and water.

Figure 3:
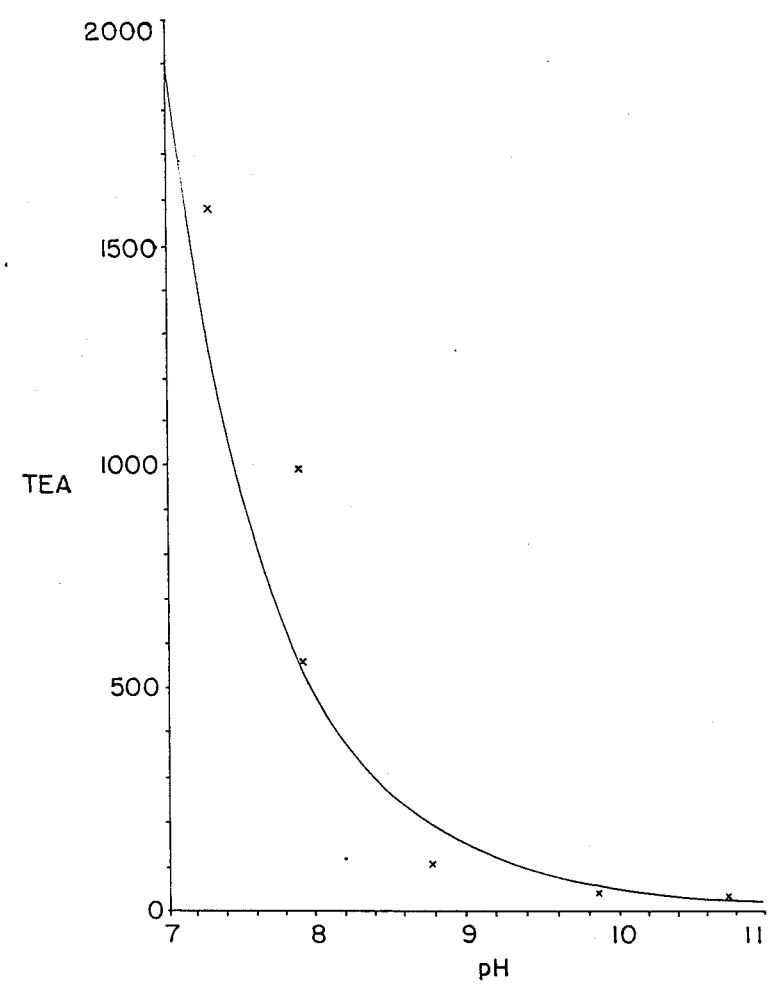
FIG. 3 is a graph showing the amount of residual triethylamine remaining in the water component as a function of the pH of the water component.

FIG. 3 is a graph showing the amount of amine (in this particular case, triethylamine) remaining in the water component after steam stripping as a function of pH of the water component after substantially all residual amine has been removed. As can be seen in FIG. 3, the amount of amine remaining in the water decreases dramatically with increasing pH. Applicants have found that a preferable operating range is where the pH of the water component is between 9.5 and 10.

The following example is set forth to better enable one of ordinary skill in the art to reproduce the invention as described above. This example is intended to be illustrative and is not intended in any manner to limit the invention described and claimed herein.

EXAMPLE

A controlled laboratory test was conducted in glassware on three samples of municipal sewage sludge. Each sample of sludge was mixed with cold triethylamine, followed by centrifugation to produce a solid pellet. Then, each pellet was washed with fresh, cold triethylamine and centrifuged again. The amount of triethylamine used in each wash was three times the amount of sludge, on a weight to weight basis. Each pellet was oven dried at 105 degrees C. for 12 hours. The three samples were handled under identical conditions, with the following exceptions:

Sample 1—no alkali was added at all.

Sample 2—caustic soda was added to the sludge before mixing with the amine.

Sample 3—caustic soda was added in the same amount as sample 2 to the sludge along with the amine.

A portion of the oven-dried solids was extracted in acidic de-ionized water by vigorous shaking overnight. The water was acidified to minimize loss of the amine to atmosphere. The solids were then removed from the water extract by gravity filtration. The water extract was then analyzed for triethylamine using a Hewlett-Packard 5890 gas chromatograph. The amount of triethylamine found was then expressed as a percentage of the amount of oven dried solids added to the de-ionized water. The results are shown in the chart below.

| SAMPLE | % TRIETHYLAMINE IN DRIED SOLIDS |
| --- | --- |
| 1 (no alkali) | 2.8 |
| 2 (alkali added to sludge before mixing with amine) | 1.0 |
| 3 (alkali added to sludge along with amine) | 1.1 |

The difference in the triethylamine percentage in sample 2 and sample 3 is not believed to be analytically significant. The total amount of triethylamine remaining in the dried solids could be reduced even further in Samples 2 and 3 by adding more alkali.

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. In a method for breaking an emulsion containing oil and water, said method including the steps of:

mixing the emulsion with an amine, or a mixture of amines, having an inverse critical solution temperature with water to form a single-phase mixture, wherein said single-phase mixture has a temperature below the inverse critical solution temperature of the amine and wherein said amine or mixture of amines is selected from a group of amines having the formula:

wherein:

$R_1$ is hydrogen or alkyl;

$R_2$ and $R_3$ are alkyl radicals having from one to six carbon atoms or alkenyl radicals having from two to six carbon atoms; and the total number of carbon atoms in the molecule is in the range of from three to seven, inclusive;

increasing the temperature of the single-phase mixture above the inverse critical solution temperature of the amine to yield a water component containing residual amine, and an oil-amine component containing residual water;

separating the water component from the oil-amine component by physical separation; and removing the residual amine from the water component, the improvement comprising:

adding an alkali to the emulsion coincident with the step of mixing the emulsion with the amine, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid, and wherein the amount of alkali added is sufficient to remove substantially all the residual amine from the water component.

2. The method of claim 1 further comprising the step of determining whether the amount of alkali added to the emulsion is sufficient to reduce the residual amine in the water component.

3. The method of claim 2 wherein the step of determining whether the amount of alkali added is sufficient includes measuring the pH of the water component after the step of removing the residual amine from the water component.

4. The method of claim 3 wherein the step of adding alkali includes adding sufficient alkali such that the pH of the water component after the step of removing residual amine from the water component is about 9.5 to 10.

5. The method of claim 1 wherein the amine is triethylamine.

6. In a method for breaking a sludge containing water and solid matter, said method including the steps of:

mixing the sludge with an amine, or a mixture of amines, having an inverse critical solution temperature with water to form a mixture, wherein said mixture has a temperature below the inverse critical solution temperature of the amine and wherein said amine or mixture of amines is selected from a group of amines having the formula:

wherein:

$R_1$ is hydrogen or alkyl;

$R_2$ and $R_3$ are alkyl radicals having from one to six carbon atoms or alkenyl radicals having from two to six carbon atoms; and the total number of carbon atoms in the molecule is in the range of from three to seven, inclusive;

separating the solid matter from the mixture, leaving a single-phase water-amine mixture;

increasing the temperature of the water-amine mixture above the inverse critical solution temperature of the amine to yield a water component containing residual amine, and an amine component containing residual water;

separating the water component from the amine component by physical separation; and removing the residual amine from the water component, the improvement comprising:

adding an alkali to the sludge coincident with the step of mixing the sludge with the amine, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid, and wherein the amount of alkali added is sufficient to remove substantially all the residual amine from the water component, and is sufficient to remove substantially all residual amine from the solid matter.

7. The method of claim 6 wherein the sludge further contains oil soluble in the amine and the oil remains with the amine component.

8. The method of claim 6 further comprising the step of determining whether the amount of alkali added is sufficient to remove substantially all residual amine from the water component, and is sufficient to remove substantially all residual amine from the solid matter.

9. The method of claim 8 wherein the step of determining whether the amount of alkali added is sufficient includes measuring the pH of the water component after the step of removing substantially all residual amine from the water component.

10. The method of claim 9 wherein the step of adding alkali includes adding sufficient alkali such that the pH of the water component after the step of removing residual amine is about 9.5 to 10.

11. The method of claim 6 wherein the amine is triethylamine.

12. In a method for breaking an emulsion containing oil and water, said method including the steps of:

mixing the emulsion with an amine, or a mixture of amines, having an inverse critical solution temperature with water to form a single-phase mixture, wherein said single-phase mixture has a temperature below the inverse critical solution temperature of the amine and wherein said amine or mixture of amines is selected from a group of amines having the formula:

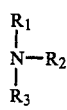

wherein:
$R_1$ is hydrogen or alkyl;
$R_2$ and $R_3$ are alkyl radicals having from one to six carbon atoms or alkenyl radicals having from two to six carbon atoms; and
the total number of carbon atoms in the molecule is in the range of from three to seven, inclusive;
increasing the temperature of the single-phase mixture above the inverse critical solution temperature of the amine to yield a water component containing residual amine, and an oil-amine component containing residual water;
separating the water component from the oil-amine component by physical separation; and
removing the residual amine from the water component, the improvement comprising:
adding an alkali to the emulsion coincident with the step of mixing the emulsion with an amine, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid; and
adding alkali to the water component before the step of removing residual amine from the water component, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid, and wherein the total amount of alkali added is sufficient to remove substantially all residual amine from the water component.

13. The method of claim 12 wherein the amount of alkali added to the emulsion is approximately 85 to 95% of the total alkali added.

14. The method of claim 12 further comprising the step of determining whether sufficient alkali has been added to remove substantially all residual amine from the water component.

15. The method of claim 14 wherein the step of determining whether sufficient alkali has been added includes measuring the pH of the water component after the step of removing residual amine from the water component.

16. The method of claim 15 wherein the steps of adding alkali including adding sufficient alkali such that the pH of the water component after the step of removing residual amine from the water component is about 9.5 to 10.

17. The method of claim 12 wherein the amine is triethylamine.

18. In a method for breaking a sludge containing water and solid matter, said method including the steps of:
mixing the sludge with an amine, or a mixture of amines, having an inverse critical solution temperature with water to form a mixture, wherein said mixture has a temperature below the inverse critical solution temperature of the amine and wherein said amine or mixture of amines is selected from a group of amines having the formula:

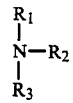

wherein:
$R_1$ is hydrogen or alkyl;
$R_2$ and $R_3$ are alkyl radicals having from one to six carbon atoms or alkenyl radicals having from two to six carbon atoms; and
the total number of carbon atoms in the molecule is in the range of from three to seven, inclusive;
separating the solid matter from the mixture, leaving a single-phase water-amine mixture;
increasing the temperature of the water-amine mixture above the inverse critical solution temperature of the amine to yield a water component containing residual amine, and an amine component containing residual water;
separating the water component from the amine component by physical separation; and
removing the residual amine from the water component, the improvement comprising:
adding an alkali to the sludge coincident with the step of mixing the sludge with the amine, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid; and
adding alkali to the water component before the step of removing residual amine from the water component, wherein the alkali is selected from the group consisting of lithium hydroxide, sodium hydroxide, potassium hydroxide, calcium hydroxide, magnesium hydroxide and a lithium, sodium, potassium, calcium or magnesium salt of a weak acid, and wherein the total amount of alkali added is sufficient to remove substantially all residual amine from the water component and the solid matter.

19. The method of claim 18 wherein the sludge further contains oil soluble in the amine, and the oil remains in the amine component.

20. The method of claim 18 wherein the amount of alkali added to the sludge is approximately 85 to 95% of the total alkali added.

21. The method of claim 18 further comprising the step of determining whether the amount of alkali added is sufficient to remove substantially all residual amine from the water component, and is sufficient to remove substantially all residual amine from the solid matter.

22. The method of claim 21 wherein the step of determining whether the amount of alkali added is sufficient includes measuring the pH of the water component after the step of removing residual amine from the water component.

23. The method of claim 22 wherein the steps of adding alkali include adding sufficient alkali such that the pH of the water component after removal of substantially all residual amine is about 9.5 to 10.

24. The method of claim 18 wherein the amine is triethylamine.

* * * * *